United States Patent [19]
Reber

[11] 4,059,944
[45] Nov. 29, 1977

[54] HAYMAKING MACHINE FOR THE TEDDING AND WINDROWING OF FODDER

[75] Inventor: Walter Reber, Saverne, France
[73] Assignee: Kuhn, S.A., Saverne, France
[21] Appl. No.: 683,032
[22] Filed: May 4, 1976
[30] Foreign Application Priority Data
   May 5, 1975 France ............................... 75.14257
   Oct. 28, 1975 France ............................... 75.33490
[51] Int. Cl.² ........................................... A01D 79/00
[52] U.S. Cl. ................................................. 56/370
[58] Field of Search .................. 56/370, 368, 365, 400

[56] References Cited
U.S. PATENT DOCUMENTS

| 3,555,800 | 1/1971 | Stell et al. | 56/370 |
| 3,820,314 | 6/1974 | Reber | 56/370 |

FOREIGN PATENT DOCUMENTS

| 2,210,609 | 3/1972 | Germany | 56/370 |

Primary Examiner—Jay N. Eskovitz
Attorney, Agent, or Firm—Young & Thompson

[57] ABSTRACT

A haymaking machine for the tedding and windrowing of fodder comprises a pair of rake wheels driven in rotation, with working tool-carrier arms mounted pivotally in support bearings thereon and having at their ends facing the rotation axis of the corresponding rake wheel, a control crank that has a roller that moves in a guide cam so as to cause the working tools to pivot over a portion of their path of revolution, upward and in the direction opposite to the direction of rotation of the corresponding rake wheel during windrowing. The control cranks are connected with the working tool-carrier arms by means of an articulation, the angle formed between the geometric axes of the control cranks and the geometric axes of the working tool-carrier arms, as seen from above, varying when the carrier arms are transposed from the windrowing position into the tedding position and vice versa. The rollers fast with the control cranks remain in engagement with the guide cam of the corresponding rake wheel both during windrowing and during tedding.

22 Claims, 21 Drawing Figures

HAYMAKING MACHINE FOR THE TEDDING AND WINDROWING OF FODDER

INTRODUCTION AND BACKGROUND OF THE INVENTION

The present invention relates to a haymaking machine for the tedding and windrowing of fodder, comprising one or more rake wheels driven in rotation. The said rake wheels are provided with arms carrying working tools which are mounted for pivoting in support bearings and have at their end towards the rotation axis of the corresponding rake wheel a control crank provided with a roller which moves in a guide cam so as to pivot the working tools, over a partial range of their path of revolution, upwards and in the direction opposite to the direction of rotation of the corresponding rake wheel during windrowing.

Machines based upon this principle carry out excellent windrowing work.

For tedding it is desirable to be able to attenuate or neutralise the pivoting movement of the working tools in order to obtain vigorous treatment of the fodder.

On a machine of this kind it is known to withdraw the rollers, fixed to the tool carrier arms, from the guide cam by displacement of the said rollers outwards for tedding and to return the rollers into contact with the said cam by inward displacement of the said rollers for windrowing. This transposition of the tool-carrier arms from the tedding position into the windrowing position and vice versa necessitates delicate adjustments.

Moreover each of the tool-carrier arms must be brought separately into the tedding position and immobilised in this position so that it can no more rotate about its longitudinal axis, which frequently represents a loss of time for the user.

Furthermore this machine does not permit of having a substantial increase in the diameter of the trajectories described by the working tools in tedding, which on a machine having two rake wheels necessitates the use of a telescopic frame to reduce the spacing between the trajectories described by the working tools of two adjacent rake wheels, if it is desired to obtain effective tedding work.

On another known machine of this kind the rollers fast with the tool-carrier arms are applied against a guide cam by means of torsion springs. On this machine the tool-carrier arms of one and the same rake wheel can be brought from the windrowing position into the tedding position by a downward disengagement of the guide cam until the rollers of the tool-carrier arms are out of engagement with the said cam.

A great drawback of this form of embodiment resides in the fact that in the transposition of the machine into the windrowing position or into the tedding position it is necessary for the guide cam to be displaced axially, which is not desirable in view of the fact that the position of the said cam and its rigidity in relation to its support axis determine the trajectory described by the working tools during windrowing, and thus the quality of the windrowing work. Moreover there is no increase in the diameter of the trajectories described by the working tools in the transposition from the windrowing position into the tedding position, which is detrimental to the quality of the tedding work on a machine having two rake wheels. In addition the working tools do not extend substantially perpendicularly to the ground, in front of their rake wheels — seen in the direction of travel — in the tedding position, which at the same time prevents good grasping of the fodder in front of the rake wheel and good clearance of the said fodder behind the rake wheel. Furthermore the torsion springs which apply the rollers against the guide cam are continually bent during work, resulting in rapid fatigue of the said springs followed by an appreciable reduction of the quality of work, in particular during tedding when the fodder to be displaced is green and thus heavy.

On a final machine of the kind concerned by the invention the rollers fast with the tool-carrier arms move on a guide cam of modifiable profile. It is not desirable to interfere with the cam for the transposition from the windrowing position into the tedding position or vice versa, in view of the fact that the rigidity of the cam determines the quality of work. Moreover it is difficult, from the design viewpoint, to produce a guide cam with variable profile. Furthermore on this machine there is no increase of the diameter of the trajectories described by the working tools during transposition into the tedding position.

Finally the said working tools do not extend substantially perpendicularly to the ground, in front of their rake wheels, in the said tedding position.

The purpose of the present invention consists in obtaining a haymaking machine of the kind described in the introduction which does not possess the above-mentioned drawbacks of the known machines.

BRIEF SUMMARY OF THE INVENTION

To this end, one of the characteristics of the invention consists in that the control cranks provided with rollers are connected to the working tool-carrier arms by means of an articulation and in that the angle formed between the geometric axes of the control cranks and the geometric axes of the working tool-carrier arms, seen from above, varies when the said carrier arms are transposed from the windrowing position into the tedding position and vice versa, while the rollers fast with the said control cranks are in engagement with the guide cam of the corresponding rake wheel both during windrowing and during tedding.

FURTHER DESCRIPTION AND ADVANTAGES OF THE INVENTION

According to another characteristic of the invention the control cranks oscillate freely under the action of the rollers without pivoting the said working tool-carrier arms during tedding.

According to a further characteristic of the invention an articulation of the Cardan joint kind is placed between the working tool-carrier arms and the control cranks.

According to a further characteristic of the invention each of the articulations placed between the working tool-carrier arms and the control cranks is constituted by a cylindrical pivot. One of the ends of this pivot is articulated in a bearing of the control crank while the end of the working tool-carrier arm directed towards the center of the rake wheel of the machine cooperates with the other end of the pivot in the manner of a mortice and tenon joint.

According to a further characteristic of the invention the working tool-carrier arms are transposed from the windrowing position into the tedding position and vice versa by pivoting about a spindle fast with the corresponding drive hub and the geometric axis of said spindle seen from above pases through the intersection point between the geometric axes of the said working tool-carrier arms and the geometric axes of the control cranks.

Further characteristics and advantages of the invention will appear from the following description, with reference to the accompanying drawings which represent by way of non-limitative example three forms of embodiment of the invention.

BRIEF DESCRIPTION OF THE VIEWS IN THE DRAWINGS

In these drawings:

FIG. 1 represents a front view of the machine according to the invention in the windrowing position, FIG. 2 represents a plan view of the machine as represented in FIG. 1, FIG. 3 represents a profile view of the machine as represented in FIG. 1, FIG. 4 represents a profile view of a machine according to the invention in the tedding position, FIG. 5 represents a front view of the machine as represented in FIG. 4, FIG. 6 represents a plan view of the machine as represented in FIGS. 4 and 5, FIG. 7 represents a section of a rake wheel in the wind-rowing position on a larger scale in the vertical plane A—A according to FIG. 2, FIG. 8 represents a section in the horizontal section plane C—C according to FIG. 7, FIG. 9 represents a section of a rake wheel in the tedding position, on a larger scale, in the vertical section plane B—B according to FIG. 6, FIG. 10 represents a section in the horizontal section plane E—E according to FIG. 9, FIG. 13 represents a section analogous with that represented in FIG. 11 of a second example of embodiment of the articulation between the working tool-carrier arms and the control cranks, FIG. 14 represents a section analogous with that represented in FIG. 12 of the second example of embodiment of the articulation between the working tool-carrier arms and the control cranks, FIG. 16 represents a section analogous with that represented in FIG. 9 of a rake wheel with a third example of embodiment of the articulation between the working tool-carrier arms and the control cranks, FIG. 17 represents a section on a larger scale in the section plane I—I according to FIG. 16 of the third example of embodiment of the articulation between a control crank and a working tool-carrier arm, this arm being in the tedding position, FIG. 18 represents a front view of the rake wheel as represented in FIG. 16, when it is situated in the wind-rowing position, FIG. 19 represents a section in the section plane J—J according to FIG. 18 on a larger scale of the articulation between a control crank and a working tool-carrier arm, this arm being situated in the windrowing position and its crank in the low position.

DETAILED DESCRIPTION OF THE PREFERRED EMBODIMENTS

The haymaking machine for tedding and windrowing in accordance with the invention, which is represented in FIGS. 1 to 6, comprises by way of non-limitative example two rake wheels 1 and 2 interconnected by a transverse beam 3. This machine can be coupled to a tractor (not shown) by means for example of a draw bar 4. Each rake wheel rests on the ground by means of a wheel placed beneath the said rake wheel. These rake wheels are driven in rotation about their respective axes 6 and 7 in known manner, by drive elements (not shown) which extend from the power take-off of the tractor to the drive hubs 8 and 9 of the rake wheels 1, 2, passing through the gear boxes 10, 11 and 12, so as to rotate either in opposite directions or in the same direction. In the example as represented in FIGS. 2 and 6 the said rake wheels 1, 2 rotate, by way of non-limitative example, so as to converge forwardly, as seen in the direction of travel.

On each rake wheel 1, 2, arms 13 carrying working tools 14 such as forks, tines or analogous elements are mounted for pivoting in support bearings 15. Each carrier arm 13 has at its end towards the rotation axis 6 or 7 of the corresponding rake wheel 1, 2 a control crank 16 provided with a roller 17 which moves in a guide cam 18 so as to cause the working tools 14 to pivot, over a partial range of their path of revolution, upwards and in the direction opposite to the direction of rotation of the corresponding rake wheel 1 or 2 during wind-rowing (see FIGS. 2 and 7). This permits of depositing the fodder collected by the said working tools 14 in the form of a windrow.

In accordance with the invention the control cranks 16 provided with rollers 17 are connected to the arms 13 carrying working tools 14 by means of an articulation 19 and the angle α formed — seen from above — between the geometric axes 20 of the control cranks 16 and the geometric axes 21 of the arms 13 carrying working tools 14 varies when the said carrier arms 13 are transposed from the windrowing position into the tedding position and vice versa, while the rollers 17 fast with the said control cranks 16 are in engagement with the guide cam 18 of the corresponding rake wheel 1 or 2 both during windrowing and during tedding. The axis considered as being the geometric axis 20 of the control cranks 16 is in fact the geometric axis of the rollers 17 fast with the said control cranks. This arrangement permits of modifying the influence of the guide cam 18 and of the rollers 17 fast with the control cranks 16 upon the arms 13 carrying working tools 14, without the need for effecting delicate adjustments or for interference with the said guide cam, this being very advantageous.

Thus the geometric axes 21 of the arms 13 carrying working tools 14 form — seen from above — with the geometric axes 20 of the control cranks 16 angles α which are greater when the said carrier arms 13 occupy the tedding position (FIG. 6) than when they occupy the windrowing position (FIG. 2). Therefore in the tedding position the pivoting movement of the working tools 14 is attenuated and the fodder is no more deposited in a windrow but it is lifted, turned and spread behind the rake wheels 1, 2 — seen in the direction of travel.

In the machine according to FIGS. 6, 9 and 10, where the arms 13 carrying working tools 14 occupy the position corresponding to tedding, the geometric axes 21 of the said carrier arms 13 and the geometric axes 20 of the control cranks 16 are substantially in alignment — seen from above. In this position the control cranks 16 oscillate freely in relation to the carrier arms 13 under the action of the rollers 17, without however pivoting the said arms 13 carrying working tools 14 during tedding. Thus the fodder is subjected to vigorous treatment and is spread uniformly behind the rake wheels 1 and 2, this accelerating its drying.

Figure 11:
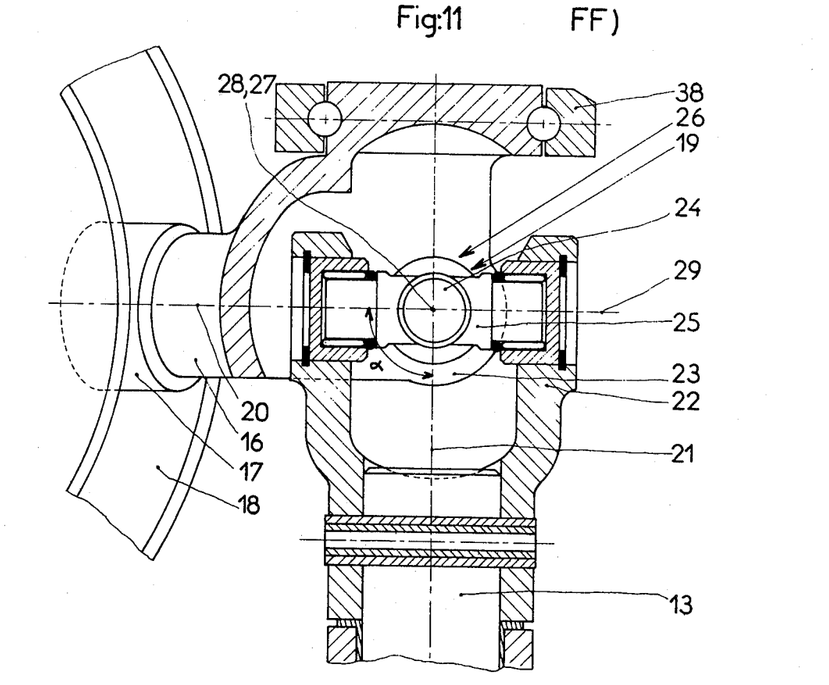
FIG. 11 represents a section of a first example of embodiment of the articulation between the working tool-carrier arms and the control cranks, on a larger scale, in the windrowing position in the section plane F—F according to FIG. 7.
Figure 12:
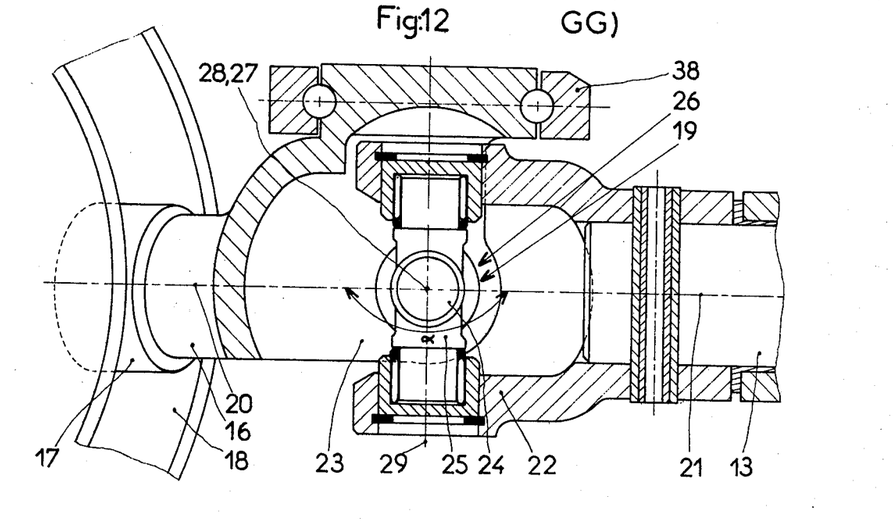
FIG. 12 represents a section of the first example of embodiment of the articulation between the working tool-carrier arms and the control cranks on a larger scale, in the tedding position, in the section plane G—G according to FIG. 9.

In a first example of embodiment represented on a larger scale in FIGS. 11 and 12, the articulations 19 between the arms 13 carrying working tools 14 and the control cranks 16 is of the Cardan joint kind. To this end the carrier arms 13 and the control cranks 16 comprise at their adjacent ends forks 22 and 23 articulated to the ends of the arms 24 and 25 of a cross-piece 26. When the carrier arms 13 are transposed from the windrowing position into the tedding position and vice versa, they pivot about geometric axes 27 of the arms 24 of the cross-piece 26. The said geometric axes 27 — seen from above — pass through the intersection points 28 between the geometric axes 21 of the carrier arms 13 and the geometric axes 20 of the control cranks 16.

In the tedding position (FIG. 12) the control cranks 16 provided with rollers 17 oscillate freely under the action of the said rollers 17 about geometric axes 29 of the arms 25 of the cross-piece 26, without pivoting the working tool carrier arms.

Figure 15:
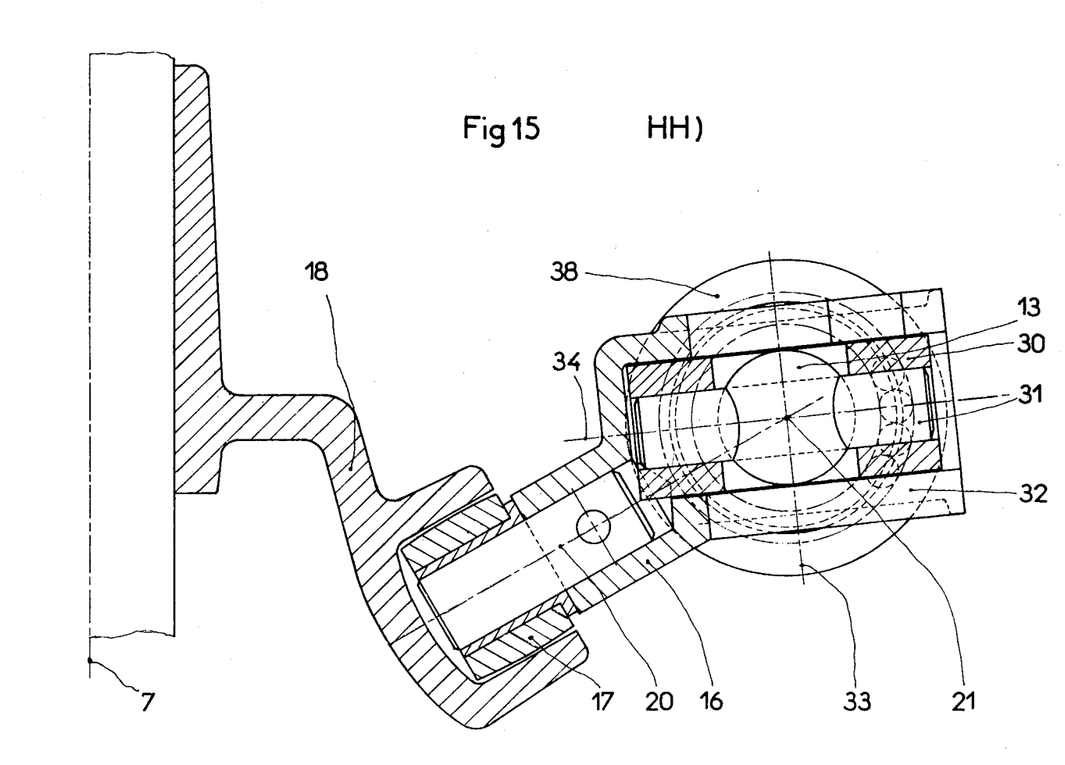
FIG. 15 represents a section of the articulation in the section plane H—H according to FIG. 13.

According to a second example of embodiment represented on a larger scale in FIGS. 13, 14 and 15, the articulation 19 between the arms 13 carrying working tools 14 and the control cranks 16 provided with rollers 17 comprises a fork 30 which on the one hand is articulated to the two ends of an arm 31 fast with the corresponding carrier arm 13 and on the other hand guided in a slideway 32 of the corresponding control crank 16. The said fork 30 at least partially matches the form of the slideway 32 and can pivot in the latter about a geometric axis 33. This fork 30 can advantageously be of plastic material in order to limit friction. In the transposition of the carrier arms 13 from the windrowing position (FIG. 13) into the tedding position (FIG. 14) or vice versa these arms pivot about the geometric axes 33 thanks to the forks 30 which move in the slideways 32 of the control cranks 16. The said geometric axes 33 — seen from above — pass through the intersection points 28 between the geometric axes 21 of the carrier arms 13 and the geometric axes 20 of the control cranks 16. In the tedding position the control cranks 16 provided with rollers 17 oscillate freely under the action of the said rollers 17 about the geometric axes 34 of the arms 31 fast with the carrier arms 13, without pivoting the said working tool-carrier arms.

In the two examples of embodiment as described above the arms 13 carrying working tools 14 are transposed from the wind-rowing position into the tedding position and vice versa by pivoting of their respective support bearings 15 about a spindle 35 fast with the corresponding drive hub 8 or 9.

In order to ensure rigidity of the machine in the various working positions and during the changes of position, the control cranks 16 connected to the arms 13 carrying working tools 14 are articulated and guided in fixed support bearings 38 made fast with the drive hub 8 or 9 by means of the pivot spindles 35 of the support bearings 15 of the carrier arms 13 (FIGS. 7, 8 and 9).

In the third example of embodiment of the articulation 19, represented in FIGS. 16 to 19, the arms 13 carrying working tools 14 are mounted for pivoting in the support bearings 15 and are translationally immobilised in relation to the support bearings 15 by two stops 50 and 51 situated one on either side of the extremities of the said support bearings 15. These bearings are respectively connected by a strut 52 to a tube 53 pivoting about the spindle 35 fast with the drive hub 9. An L-shaped support 54 is fixed by its shorter part to the lower extremity of this spindle 35. The longer part of this support 54 extends downwards in a plane parallel with the plane defined by the geometric axis 20 of the control crank 16 and of its roller 17 and the geometric axis 21 of the arm 13 when the latter is in the tedding position. The lower extremity of the longer part of the support 54 is provided with a spindle 55 the geometric axis of which is perpendicular to the geometric axis 36 of the pivot spindle 35 and to the plane defined by the geometric axes 20 and 21 mentioned above. Each spindle 55 cooperates with the control crank 16 and permits it to oscillate when its roller 17 follows the profile of the guide cam 18 of the rake wheel. Each control crank 16 in fact comprises three bearings 56, 57 and 58. The spindle of the roller 17 is engaged in the first bearing 56 and a pivot 59 is pivotably mounted in the second bearing 57. In the example of embodiment illustrated by FIGS. 16 and 17, where the articulations 19 are represented in the tedding position, the geometric axis 20 of the control crank 16 and of its roller 17 forms an angle slightly less than 90° with the geometric axis 60 of the pivot 59. The geometric axis of the third bearing 58 of the control crank 16 coincides with the axis of the spindle 55 and is situated in a plane perpendicular to the plane defined by the aforementioned geometric axes 20 and 60.

The three geometric axes of these bearings 56, 57 and 58 intersect at one and the same point 28 in the plane defined by the intersection of the geometric axis 20 of the control crank 16 and its roller 17 and the geometric axis 60 of the pivot 59; this point 28 is likewise the point of intersection of the geometric axes 21 of the arms 13 and of the said geometric axes 20 of the control cranks 16 and their rollers 17.

The pivot 59, the end 61 of which is cylindrical, can pivot in the bearing 57. The other end 62 of this same pivot 59 is spherical and comprises a slot 63 the sides of which extend in two parallel planes, these likewise being parallel to the geometric axis 60 of the pivot 59. The center of the spherical extremity 62 of the pivot 59 is situated at the point 28 of intersection of the axes of the bearings 56, 57 and 58.

The working tool-carrier arms 13 are provided respectively, at their ends directed towards the rake wheel, with a rounded part 64 having two flats the flanks of which extend in two parallel planes, these planes likewise being parallel with the geometric axis 21 of the arms 13. The rounded part 64 of each arm 13 has a radius corresponding to the radius of the spherical extremity 62 of the pivot 59. This permits the rounded parts 64 of the arms 13 to come respectively into engagement in the slots 63 of the pivots 59 and to be able to pivot therein.

The manner of operation of the device according to the third example of embodiment is as follows:

If it is assumed that the machine is in the tedding position as represented in FIG. 16, in FIG. 17 it is seen that the geometric axes 21 of the arms 13 are situated respectively in the same plane as the geometric axes 20 of the control cranks 16 and of their rollers 17 and the geometric axes 60 of the pivots 59. Therefore when the machine is used for tedding and the arms 13 rotate about the axis 7 of the rake wheel, the control cranks 16 oscillate about the spindle 55 thanks to their bearing 58 when the rollers 17 of the said cranks 16 follow the profile of the guide cam 18. This oscillation has no influence upon the arms 13 which are subjected to no rotation about their geometric axes 21 since the rounded part 64 of each arm 13 is engaged in the slot 63 of the corresponding pivot 59, that the geometric axis 60 of each pivot 59 forms with the geometric axis 21 of each arm 13 an angle which is variable in the course of the rotation of the rake wheel, this angle however being always less than 180°, that the flanks of the slot 63 of the pivot 59 and those of the flats of the rounded part 64 are all situated in the plane of oscillation of the control crank 16 and that the axes of the bearings 56, 57 and 58 cross at the intersection point 28 of the geometric axes 21 of the arms 13 and of the geometric axes 20 of the control cranks 16 and their rollers 17, this intersection point 28 likewise being the center of the spherical part 62 of the pivots 59 and that of the rounded parts 64 of the ends of the arms 13.

If it is desired to carry out windrowing work, the arms 13 carrying working tools 14 are pushed or pulled so that they pivot with their respective support bearings 15 about the pivot spindles 35 fast with the drive hub 9 by an angle substantially equal to 90° without rotating upon themselves (FIGS. 18 and 19). Only the arms 13 of which the rollers 17 of the control cranks 16 are situated in the high part of the guide cam 18 rotate about their respective geometric axes 21 so that the tools of these arms 13 are raised, the position of the said tools then corresponding to that in which the fodder is dropped for the purpose of formation of a windrow.

When the machine is ready for windrowing it is seen especially from FIGS. 18 and 19 that the geometric axes 21 of the arms 13 are no more concurrent and no more pass through the axis 7 of the rake wheel. These arms occupy a position in which their geometric axes are tangential to a circle which extends in a plane perpendicular to the axis 7 of the rake wheel, the center of this circle coinciding with the said axis 7. The pivots 59 have likewise pivoted through 90° in such manner that the flanks of their slots 63 are now situated in a plane perpendicular to the plane defined by the geometric axes 20 of the control cranks 16 and their rollers 17 and the geometric axes 60 of the said pivots 59. Consequently when the cranks 16, the rollers 17 of which follow the profile of the cam 18, oscillate in the plane defined by the said axes 20 and 60 while pivoting about their respective spindles 55, a rotation of the arms 13 about their geometric axes 21 is produced, these arms being guided in rotation and translationally immobilised in their respective support bearings 15, the geometric axes 21 of which intersect the axes of the spindles 55 at the points 28.

However this rotation of the arms 13 starts only when the rollers 17 attack the slope of the guide cam 18, the arms having returned into their initial positions when the said rollers have left the said slope.

The articulation 19 between the arms 13 carrying working tools 14 and the control cranks 16 can likewise be a spherical or ball joint articulation, without departing from the scope of the invention.

According to one important characteristic of the invention, the geometric axis 36 of the spindles 35 fast with the drive hub 8 or 9, about which the support bearings 15 of the carrier arms 13 pivot, passes — seen from above — through the point 28 of intersection between the geometric axes 21 of the said carrier arms 13 and the geometric axes 20 of the control cranks 16. This characteristic permits the carrier arms 13 to pivot from the tedding position into the windrowing position or vice versa without jamming or deterioration of the articulations 19 (FIGS. 7 to 10 and 16).

When the machine according to the invention is transposed into the tedding position, in which the control cranks 16 oscillate freely without pivoting the arms 13 carrying working tools 14, the said cranks 16 and the rollers 17 block the working tools 14 in a plane substantially vertical to the ground. This arrangement permits of avoiding special devices for blocking the working tools in tedding.

Moreover the pivoting of the arms 13 carrying working tools 14 from the windrowing position into the tedding position involves a substantial increase in the diameter of the trajectories described by the said working tools 14. In fact the distance between the working tools 14 and the rotation axis 6 or 7 of the corresponding rake wheel 1 or 2 is greater in the tedding position (FIG. 6) than in the windrowing position (FIG. 2). This increase of the diameter of the trajectories described by the working tools 14 ensures tedding of excellent quality since, in the case of a machine having two or more rake wheels, the spacing between the trajectories described by the working tools 14 of two adjacent rake wheels is considerably reduced; the said trajectories can even deeply overlap between the rotation axes 6 and 7 of two adjacent rake wheels.

In accordance with the invention the pivot spindles 35 of the arms 13 carrying working tools 14 are inclined so that their geometric axis 36 intersects the rotation axis 6 or 7 of the corresponding rake wheel 1 or 2. This inclination causes an elevation of the said carrier arms 13 in relation to the ground during their pivoting from the windrowing position into the tedding position. Thus in the said tedding position (FIG. 4), tanks to a specific adjustment of the angle of inclination of the rake wheels 1 and 2 in relation to the ground, by means of a device such as a threaded crank handle 37 which pivots the transverse beam 3 in relation to the draw bar 4, it is possible to bring the working tools 14 into a substantially perpendicular position in relation to the ground at the front — seen in the direction of travel. This feature permits of obtaining good grasping of the fodder by the working tools 14 which are all in contact with the ground in front of the rake wheels 1 and 2 and good clearance of the said fodder behind the rake wheels 1 and 2 — seen in the direction of travel — (FIG. 4).

According to a characteristic of the invention all the support bearings 15 of the carrier arms 13 of one and the same rake wheel 1 or 2 are interconnected, for example by means of rods 39 hooked into plates 44 fast with the said support bearings 15, so that the said arms 13 carrying working tools 14 of one and the same rake wheel 1 or 2 pivot simultaneously about the pivot spindles 35 during the transposition of the machine from the windrowing postion into the tedding position and vice versa (FIGS. 8 and 10).

It is apparent that other means than those described above can be utilised to effect the connection between the support bearings 15 of the arms 13 carrying working tools 14, without thereby departing from the scope of the present invention.

Figure 20:
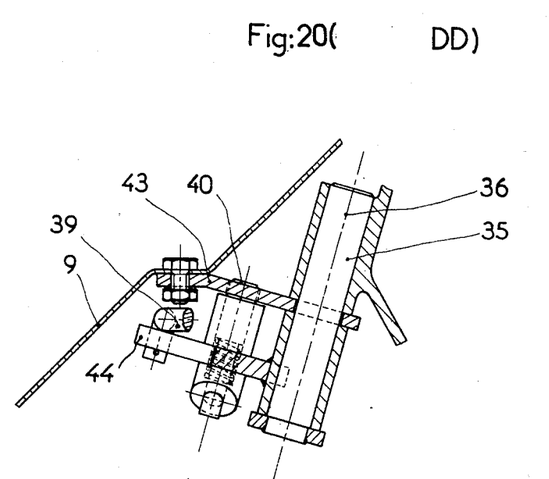
FIG. 20 represents a section of a device for locking the working tool-carrier arms in the tedding position or the wind-rowing position on a larger scale in the vertical section plane D—D according to FIG. 8.
Figure 21:
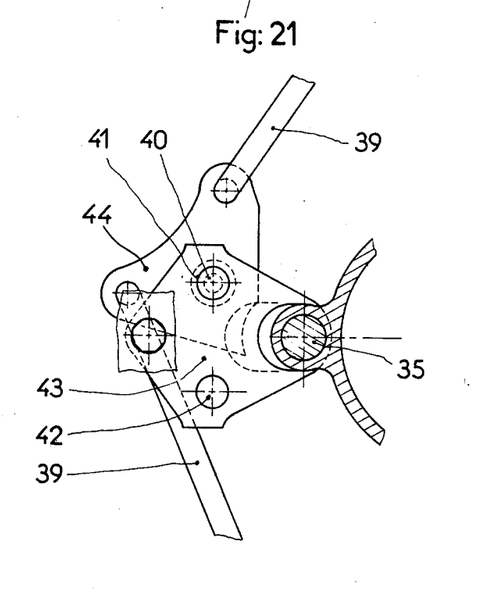
FIG. 21 represents a plan view, partially in section, of the locking device as represented in FIG. 20.

All the arms 13 carrying working tools 14 of one and the same rake wheel 1 or 2 can be immobilised in the tedding position or in the windrowing position by means of a spring bolt 40 which engages in lodgements 41 or 42 provided in a positioning plate 43 fast with the corresponding drive hub 8 or 9 (FIGS. 20 and 21).

The transposition from the windrowing position into the tedding position takes place in the following manner. The carrier arms 13 of one and the same rake wheel 1 or 2 are freed from the windrowing position by exertion of a downward pressure upon the spring bolt 40 which is in engagement with the lodgement 41 of the positioning plate 43. Then a thrust or a pull is exerted upon one of the carrier arms 13, the said arm then pivoting thanks to its support bearing 15 about the corresponding pivot spindle 35, entraining all the other arms 13 carrying working tools 14 in its movement by means of the rods 39 which interconnect the support bearings 15. As soon as the carrier arms 13 arrive in the tedding position, the spring bolt 40 automatically engages in the lodgement 42 of the positioning plate 43 under the action of its spring, and immobilises the carrier arms 13 in the said tedding position.

The transposition of the machine from the tedding position into the windrowing position is effected in a similar manner.

It is quite apparent that it will be possible to effect various improvements, modifications or additions to the types of articulations which have been described, without thereby departing from the scope of the present invention.

I claim:

1. In a haymaking machine for the tedding and windrowing of fodder, comprising at least one rake wheel driven in rotation on which working tool-carrier arms are mounted for pivoting in support bearings and possess at their ends facing the rotation axis of the corresponding rake wheel a control crank provided with a roller which moves in a guide cam so as to cause the working tools to pivot, over a portion of their path of revolution, upwards and in the direction opposite to the direction of rotation of the corresponding rake wheel during windrowing; the improvement in which the control cranks provided with rollers are connected with the working tool-carrier arms by means of an articulation, the angle formed between the geometric axes of the control cranks and the geometric axes of the working tool-carrier arms, seen from above, varying when the said carrier arms are transposed from the windrowing position into the tedding position and vice versa, the rollers fast with the said control cranks remaining in engagement with the guide cam of the corresponding rake wheel both during windrowing and during tedding.

2. A machine according to claim 1, characterised in that the geometric axes of the working tool-carrier arms, seen from above, form with the gometric axes of the control cranks angles which are greater when the said carrier arms occupy the said tedding position than when they occupy the windrowing position.

3. A machine according to claim 2, characterised in that the geometric axes of the working tool-carrier arms and the geometric axes of the control cranks, seen from above, are substantially aligned when the said carrier arms occupy the tedding position.

4. A machine according to claim 3, characterised in that when the working tool-carrier arms occupy the tedding position the control cranks oscillate freely under the action of the rollers without however pivoting the said working tool-carrier arms during tedding.

5. A machine according to claim 1, characterised in that the control cranks of the carrier arms are articulated and guided in fixed support bearings.

6. A machine according to claim 1, characterised in that the working tool-carrier arms are transposed from the windrowing position into the tedding position and vice versa by pivoting about a spindle fast with the corresponding drive hub and the geometric axis of which, seen from above, passes through the intersection point between the geometric axes of the said carrier arms and the geometric axes of the control cranks.

7. A machine according to claim 6, characterised in that the geometric axes of the pivot spindles of the carrier arms intersect the rotation axis of the corresponding rake wheel.

8. A machine according to any one of claim 6, characterised in that the distance between the working tools and the rotation axis of the corresponding rake wheel is greater in the position which the carrier arms occupy for tedding than in the position which the said carrier arms occupy for windrowing.

9. A machine according to claim 6, characterised in that all the support bearings of the carrier arms of one and the same rake wheel are interconnected by means of rods in such manner that all the working tool-carrier arms of one and the same rake wheel pivot simultaneously about pivot spindles.

10. A machine according to claim 9, characterised in that all the working tool-carrier arms of one and the same rake wheel are immobilised in the tedding position or in the windrowing position by means of a spring bolt which engages in lodgements provided in a positioning plate fast with the corresponding drive hub.

11. In a haymaking machine for the tedding and windrowing of fodder, comprising at least one rake wheel driven in rotation on which working tool-carrier arms are mounted for pivoting in support bearings and possess at their ends facing the rotation axis of the corresponding rake wheel a control crank provided with a roller which moves in a guide cam so as to cause the working tools to pivot, over a portion of their path of revolution, upwards and in the direction opposite to the direction of rotation of the corresponding rake wheel during windrowing; the improvement in which the control cranks provided with rollers are connected with the working tool-carrier arms by means of a Cardan joint comprising two forks disposed respectively on the adjacent ends of the said control cranks and of the said tool-carrier arms and articulated on the ends of the two arms of a cross-piece, the angles formed between the geometric axes of the control cranks and the geometric axes of the working tool-carrier arms, seen from above, being greater when the said arms occupy the tedding position then when they occupy the windrowing position, said geometric axes of the working tool-carrier arms and the said geometric axes of the control cranks being substantially aligned when the said carrier arms occupy the tedding position, whereby the control cranks oscillate freely under the action of the rollers engaged with the guide cam without however pivoting the said working tool-carrier arms during tedding.

12. A machine according to claim 11, characterised in that the geometric axes of the arms of the Cardan joint about which the working tool-carrier arms pivot in the transposition from the windrowing position into the tedding position and vice versa, seen from above, pass through the intersection point between the geometric axes of the said carrier arms and the geometric axes of the control cranks.

13. In a haymaking machine for the tedding and windrowing of fodder, comprising at least one rake wheel driven in rotation on which working tool-carrier arms are mounted for pivoting in support bearings and possess at their ends facing the rotation axis of the corresponding rake wheel a control crank provided with a roller which moves in a guide cam so as to cause the working tools to pivot, over a portion of their path of revolution, upwards and in the direction opposite to the direction of rotation of the corresponding rake wheel during windrowing; the improvement in which the control cranks provided with rollers are connected with the working tool-carrier arms by means of an articulation comprising a fork which on the one hand is articulated to the two ends of an arm fast with the corresponding carrier arm and on the other hand is guided in a slideway of the corresponding control crank, the angles formed between the geometric axes of the control cranks and the geometric axes of the working tool-carrier arms, seen from above, being greater when the said arms occupy the tedding position than when they occupy the windrowing position, said geometric axes of the working tool-carrier arms and the said geometric axes of the control cranks being substantially aligned when the said carrier arms occupy the tedding position, whereby the control cranks oscillate freely under the action of the rollers engaged with the guide cam without hovever pivoting the said working tool-carrier arms during tedding.

14. A machine according to claim 13, characterised in that the geometric pivot axes of the forks about which the working tool-carrier arms pivot in the transposition from the windrowing position into the tedding position and vice versa, seen from above, pass through the point of intersection between the geometric axes of the said carrier arms and the geometric axes of the control cranks.

15. In a haymaking machine for the tedding and windrowing of fodder, comprising at least one rake wheel driven in rotation on which working tool-carrier arms are mounted for pivoting in support bearings and possess at their ends facing the rotation axis of the corresponding rake wheel a control crank provided with a roller which moves in a guide cam so as to cause the working tools to pivot, over a portion of their path of revolution, upwards and in the direction opposite to the direction of rotation of the corresponding rake wheel during windrowing; the improvement in which the control cranks provided with rollers are connected with the working tool-carrier arms by means of an articulation comprising a cylindrical pivot articulated by one of its extremities in a bearing of the control cranks, the extremity of the working tool-carrier arm directed towards the axis of the rake wheel cooperating with the other extremity of the pivot, in the manner of a mortice and tenon joint, the angles formed between the geometric axes of the control cranks and the geometric axes of the working tool-carrier arms, seen from above, being greater when the said arms occupy the tedding position than when they occupy the windrowing position, said geometric axes of the working tool-carrier arms and the said geometric axes of the control cranks being substantially aligned when the said carrier arms occupy the tedding position, whereby the control cranks oscillate freely under the action of the rollers engaged with the guide cam without however pivoting the said working tool-carrier arms during tedding.

16. A machine according to claim 15, characterised in that the extremity of the working tool-carrier arm directed towards the axis of the rake wheel comprises two flats in order that it may engage in a slot in the extremity of the pivot.

17. A machine according to claim 16, characterised in that the respective flanks of the slot of the extremity of the pivot and of the flats of the extremity of the working tool-carrier arm extend in planes respectively parallel with the rotation axis of the pivot and with the axis of the said arm, these planes moreover being parallel with one another.

18. A machine according to claim 15, characterised in that the control crank comprises three bearings, the spindle of the roller engaging in the first of these, the pivot engaging in the second bearing, the geometric axis of which forms a certain angle with the geometric axis of the first bearing, the geometric axis of the third bearing being situated in a plane perpendicular to the plane defined by the geometric axes of the first two bearings.

19. A machine according to claim 18, characterised in that the axes of the three bearings intersect at one and the same point in the plane defined by the intersection of the geometric axis of the control cranks and their rollers and of the geometric axis of the pivot.

20. A machine according to claim 18, characterised in that the third bearing pivots about a fixed spindle made fast with a spindle about which the support bearing of the working tool-carrier arm pivots, by means of a support, this third bearing permitting the control crank to oscillate when the roller follows the profile of the guide cam of the rake wheel.

21. A machine according to claim 15, characterised in that the extremity of the pivot is spherical.

22. A machine according to claim 21, characterised in that the intersection point of the axes of the three bearings of the control crank is situated at the centre of the spherical extremity of the pivot.

* * * * *